(12) United States Patent
Kim

(10) Patent No.: US 8,625,684 B2
(45) Date of Patent: Jan. 7, 2014

(54) APPARATUS AND METHOD FOR ESTIMATING SYMBOL TIMING OFFSET IN A WIRELESS COMMUNICATION SYSTEM

(75) Inventor: Kwang-Chul Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 770 days.

(21) Appl. No.: 11/714,617

(22) Filed: Mar. 6, 2007

(65) Prior Publication Data

US 2007/0211809 A1    Sep. 13, 2007

(30) Foreign Application Priority Data

Mar. 6, 2006    (KR) .................. 10-2006-0020989

(51) Int. Cl.
*H04K 1/10* (2006.01)
*H04L 27/28* (2006.01)

(52) U.S. Cl.
USPC ............ 375/260; 455/59; 370/203; 370/204; 370/210

(58) Field of Classification Search
USPC ......................................... 375/260, 340, 348
See application file for complete search history.

(56) References Cited

U.S. PATENT DOCUMENTS

| | | | | |
|---|---|---|---|---|
| 5,610,908 | A * | 3/1997 | Shelswell et al. ............. | 370/210 |
| 7,684,359 | B2 * | 3/2010 | Kim et al. ..................... | 370/319 |
| 2002/0055357 | A1 * | 5/2002 | Hanada et al. ................ | 455/422 |
| 2003/0016773 | A1 | 1/2003 | Atungsiri et al. | |
| 2004/0141457 | A1 * | 7/2004 | Seo et al. ..................... | 370/203 |
| 2004/0141570 | A1 * | 7/2004 | Yamazaki et al. ............. | 375/340 |
| 2004/0228272 | A1 * | 11/2004 | Hasegawa et al. ............ | 370/210 |
| 2005/0100109 | A1 * | 5/2005 | Nagata et al. ................. | 375/260 |
| 2005/0105659 | A1 * | 5/2005 | Sheu et al. .................... | 375/360 |
| 2005/0117070 | A1 * | 6/2005 | Wu et al. ...................... | 348/725 |
| 2005/0124368 | A1 * | 6/2005 | Diao et al. .................... | 455/522 |
| 2007/0217525 | A1 * | 9/2007 | Vrcelj et al. .................. | 375/260 |

FOREIGN PATENT DOCUMENTS

| | | |
|---|---|---|
| EP | 1 478 150 A2 | 11/2004 |
| KR | 10-2004-0098989 | 11/2004 |
| KR | 10-0579531 | 5/2006 |
| KR | 10-2006-0069019 | 6/2006 |
| KR | 10-2007-0075542 | 7/2007 |
| WO | WO 2005/074218 | 8/2005 |

OTHER PUBLICATIONS

Korean Examination Report dated Apr. 30, 2012, issued in counterpart Korean Patent Application No. 10-2006-0020989; 3 pages.
Decision of Grant issued Nov. 23, 2012 in counterpart Korean Patent Application No. 10-2006-0020989 (5 pages, in Korean).

* cited by examiner

*Primary Examiner* — Shuwang Liu
*Assistant Examiner* — Gina McKie
(74) *Attorney, Agent, or Firm* — NSIP Law

(57) ABSTRACT

A method for estimating a symbol timing offset in an Orthogonal Frequency Division Multiplexing (OFDM) communication system is disclosed. The method includes detecting a channel impulse response within one Fast Fourier Transform (FFT) duration; and estimating a symbol timing offset taking the detected channel impulse response into account. The symbol timing offset estimation includes calculating a channel delay duration depending on the detected channel impulse response; and estimating the symbol timing offset such that the channel impulse response is detected within a guard interval, taking into account the calculated channel delay duration and the guard interval existing in the one FFT duration.

8 Claims, 5 Drawing Sheets

APPARATUS AND METHOD FOR ESTIMATING SYMBOL TIMING OFFSET IN A WIRELESS COMMUNICATION SYSTEM

PRIORITY

This application claims priority under 35 U.S.C. §119(a) to a Korean Patent Application filed in the Korean Intellectual Property Office on Mar. 6, 2006 and assigned Serial No. 2006-20989, the disclosure of which is incorporated herein by reference.

BACKGROUND OF THE INVENTION

1. Field of the Invention

The present invention relates generally to a wireless communication system, and in particular, to an apparatus and method for estimating a symbol timing offset in an Orthogonal Frequency Division Multiplexing (OFDM) communication system.

2. Description of the Related Art

In the $4^{th}$ Generation (4G) communication system, which is the next generation communication system, research is being conducted to provide users with high-speed services having various Qualities-of-Service (QoS). Particularly, in the 4G communication system, research is being carried out to support high-speed services while guaranteeing mobility and QoS for a Broadband Wireless Access (BWA) communication system, such as a wireless Local Area Network (LAN) system and a wireless Metropolitan Area Network (MAN) system.

Therefore, in the 4G communication system, Orthogonal Frequency Division Multiplexing (OFDM) is being studied as a scheme suitable for high-speed data transmission in wire/wireless channels. OFDM, a scheme for transmitting data using multiple carriers, is a kind of Multi Carrier Modulation (MCM) that converts a serial input symbol stream into parallel symbol streams and modulates them with multiple orthogonal sub-carriers before transmission.

The 4G communication system needs broadband-spectrum resources in order to provide high-speed, high-quality wireless multimedia services. However, the use of the broadband-spectrum resources causes a considerable fading effect in the wireless transmission path due to multipath propagation, and also causes a frequency selective fading effect even in transmission bands. Therefore, for the high-speed wireless multimedia services, OFDM, which is robust against the frequency selective fading compared with Code Division Multiple Access (CDMA), has a higher gain. Therefore, OFDM is popularly used for the 4G communication system.

The wireless channel environment in a mobile communication system, unlike the wired channel environment, suffers inevitable errors occurring due to several factors such as multipath interference, shadowing, wave attenuation, time-varying noise, Inter-Symbol Interference (ISI) caused by delay spread, frequency selective fading, and the like, thereby causing a loss of information data. The loss of information data causes considerable distortion of actual transmission signals, thereby reducing the entire performance of the mobile communication system.

In order to overcome the ISI and the frequency selective fading, the OFDM communication system transmits OFDM symbols by inserting Guard Intervals (GI) as well as using multiple orthogonal sub-carriers. A method for inserting the guard interval is classified into a Cyclic Prefix scheme of copying last specific samples of an OFDM symbol in the time domain and inserting the samples into an effective OFDM symbol, and a Cyclic Postfix scheme of copying first specific samples of an OFDM symbol in the time domain and inserting the samples into an effective OFDM symbol.

As described above, the OFDM communication system reduces the ISI effect using the guard intervals. That is, the OFDM communication system minimizes an effect of wireless channels using the guard intervals.

However, in the OFDM communication system, an effect of symbol timing is considerable in high-order modulation of the sub-carriers, for example, in 64-ary Quadrature Amplitude Modulation (64 QAM) or 256 QAM, and in this situation, the ISI effect remains.

SUMMARY OF THE INVENTION

An aspect of the present invention is to address at least the problems and/or disadvantages and to provide at least the advantages described below. Accordingly, an aspect of the present invention is to provide a scheme capable of minimizing an effect of wireless channels in a wireless communication system.

Another aspect of the present invention is to provide a scheme capable of minimizing ISI in high-order modulation of sub-carriers in a wireless communication system.

A further aspect of the present invention is to provide a scheme capable of estimating an accurate symbol timing offset using a channel impulse response in a wireless communication system.

Yet another aspect of the present invention is to provide a scheme capable of minimizing ISI through accurate symbol timing offset estimation in a wireless communication system.

According to one aspect of the present invention, there is provided a method for estimating a symbol timing offset in an Orthogonal Frequency Division Multiplexing (OFDM) communication system. The method includes detecting a channel impulse response within one Fast Fourier Transform (FFT) duration; and estimating a symbol timing offset taking the detected channel impulse response into account. The symbol timing offset estimation includes calculating a channel delay duration depending on the detected channel impulse response; and estimating the symbol timing offset such that the channel impulse response is detected within a guard interval, taking into account the calculated channel delay duration and the guard interval existing in the one FFT duration.

According to another aspect of the present invention, there is provided an apparatus for estimating a symbol timing offset in an Orthogonal Frequency Division Multiplexing (OFDM) communication system. The apparatus includes an Inverse Fast Fourier Transform (IFFT) unit for converting a frequency-domain OFDM symbol, in which channel estimation is performed, into a time-domain OFDM symbol; and a symbol timing offset estimator for receiving the time-domain OFDM symbol, detecting a channel impulse response within one Fast Fourier Transform (FFT) duration, and estimating a symbol timing offset taking the detected channel impulse response into account. The symbol timing offset estimator calculates a channel delay duration depending on the detected channel impulse response, and estimates the symbol timing offset such that the channel impulse response is detected within a guard interval, taking into account the calculated channel delay duration and the guard interval existing in the one FFT duration.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF EXEMPLARY EMBODIMENTS

Exemplary embodiments of the present invention will now be described in detail with reference to the annexed drawings. In the following description, a detailed description of known functions and configurations incorporated herein has been omitted for clarity and conciseness.

Generally, an Orthogonal Frequency Division Multiplexing (OFDM) communication system minimizes an effect of wireless channels using guard intervals (GI). However, in the OFDM communication system, an effect of symbol timing is considerable in high-order modulation of sub-carriers, for example, in 64-ary Quadrature Amplitude Modulation (64 QAM) or 256 QAM.

Therefore, the present invention estimates an accurate symbol timing offset using a channel impulse response, and through the estimation, minimizes an effect of Inter-Symbol Interference (ISI) which may occur in the conventional technology.

As described above, in order to cope with multipath channels, the OFDM communication system inserts a guard interval between symbols in the time domain before transmission. However, the use of the guard interval causes a reduction in frequency efficiency of the OFDM communication system. Therefore, research is being conducted on a method capable of efficiently removing an ISI effect while minimizing the use of the guard intervals. In order to solve these problems, the present invention estimates an accurate symbol timing offset using the channel impulse response and minimizes the ISI using the estimated symbol timing offset.

That is, the present invention provides a symbol timing offset estimation scheme using a channel impulse response. In order to estimate the symbol timing offset, an embodiment of the present invention varies a search range in detecting the peak power, and begins the search starting point at the middle of Fast Fourier Transform (FFT) duration. Further, in calculating channel delay duration, the embodiment of the present invention uses a variable threshold. That is, with use of a size of the channel delay duration, the embodiment optimizes an estimated channel delay profile, thereby minimizing the ISI.

Figure 1:
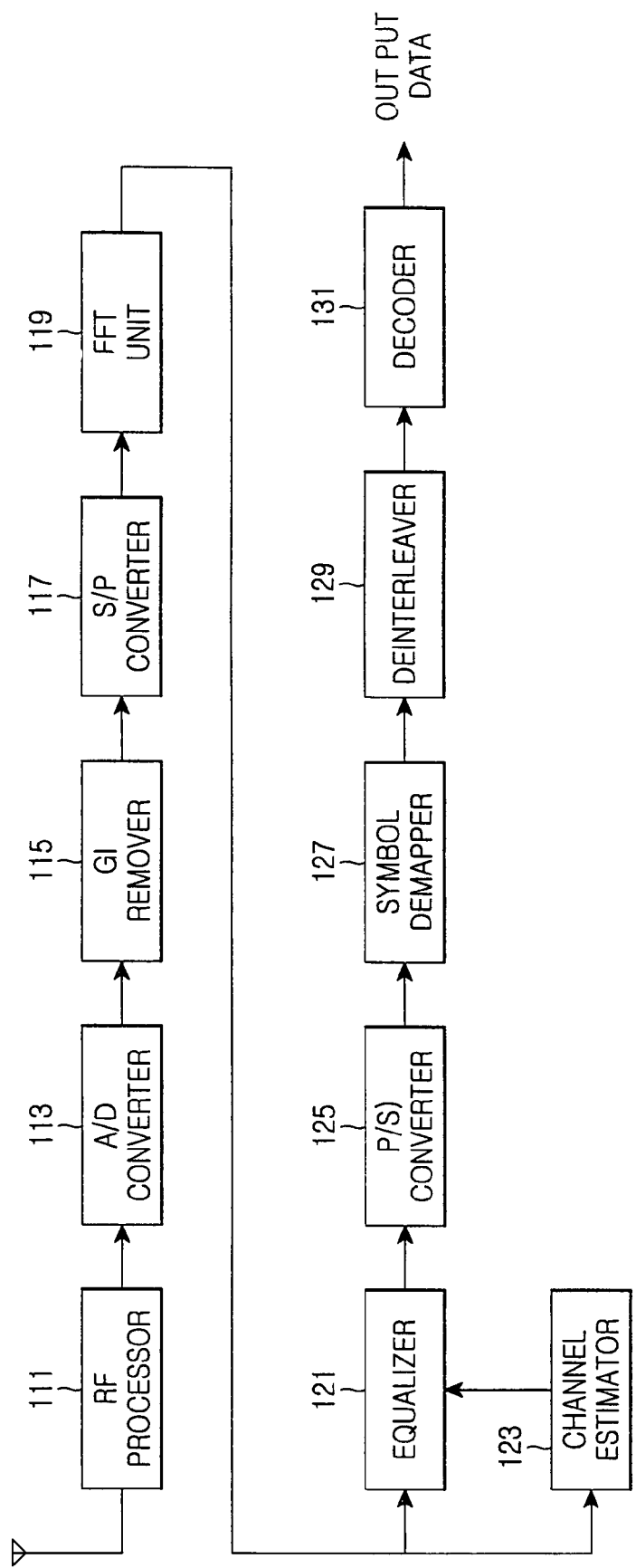
FIG. 1 is a diagram illustrating a block structure of a receiver in a general OFDM communication system to which the present invention is applied.

FIG. 1 illustrates a block structure of a receiver in a general OFDM communication system to which the present invention is applied.

Referring to FIG. 1, the receiver of the OFDM communication system includes a Radio Frequency (RF) processor 111, an analog/digital (A/D) converter 113, a guard interval remover 115, a serial/parallel (S/P) converter 117, an FFT unit 119, an equalizer 121, a channel estimator 123, a parallel/serial (P/S) converter 125, a symbol demapper 127, deinterleaver 129 and a decoder 131.

A signal transmitted by a transmitter of the communication system is received via a reception antenna of the receiver after experiencing a time-varying frequency selective fading channel and having a noise component added thereto. Herein, the signal received via the reception antenna is assumed as y(n), and the received signal y(n) can be expressed as Equation (1).

$$y(n) = \sum_{l=1}^{M} h_l(n)x(n - \tau_l) + w(n) \quad (1)$$

In Equation (1), M denotes the number of multiple paths, $\tau_l$ denotes a channel impulse response of an $1^{th}$ path, and w(n) denotes a noise component, for example, Additive White Gaussian Noise (AWGN). In addition, $h_l$ denotes a channel characteristic of an $1^{th}$ path, and x(n) denotes a transmission signal.

The signal received via the reception antenna is input to the RF processor 111, and the RF processor 111 down-converts the signal received via the reception antenna into an Intermediate Frequency (IF) band signal, and outputs the IF signal to the analog/digital converter 113. The analog/digital converter 113 digital-converts the analog signal output from the RF processor 111, and outputs the resulting signal to the guard interval remover 115.

The guard interval remover 115 removes a guard interval signal from the output signal of the analog/digital converter 113, and outputs the resulting signal to the serial/parallel converter 117. The serial/parallel converter 117 parallel-converts the serial signal output from the guard interval remover 115, and outputs the resulting signal to the FFT unit 119. The FFT unit 119 performs N-point FFT processing on the output signal of the serial/parallel converter 117, and outputs the resulting signal to the equalizer 121.

The equalizer 121 performs channel equalization on the output signal of the FFT unit 119, and outputs the resulting signal to the parallel/serial converter 125. The parallel/serial converter 125 serial-converts the output signal of the equalizer 121, and outputs the resulting signal to the symbol demapper 127.

The signal output from the FFT unit 119 is input to the channel estimator 123. The channel estimator 123 performs channel estimation using the symbols output from the FFT unit 119, and outputs the channel estimation result to the equalizer 121.

The symbol demapper 127 demodulates the signal output from the parallel/serial converter 125 using a demodulation scheme corresponding to a modulation scheme used in the transmitter of the communication system, and outputs the resulting signal to the deinterleaver 129. The deinterleaver 129 deinterleaves the signal output from the symbol demapper 127 using a deinterleaving scheme corresponding to an interleaving scheme used in the transmitter of the communication system, and outputs the resulting signal to the decoder 131.

The decoder 131 decodes the signal output from the deinterleaver 129 using a decoding scheme corresponding to a coding scheme used in the transmitter of the communication system.

The foregoing OFDM receiver reduces a negative effect on the system due to multipath and delay spread with use of guard intervals. Generally, transmission of OFDM symbols is performed symbol by symbol. However, while the OFDM symbols are transmitted over a multipath channel, they are affected by previous symbols.

In order to prevent interference between the OFDM symbols, a guard interval longer than the maximum delay spread of a channel is inserted between consecutive symbols. In this case, an OFDM symbol period is the sum of an effective symbol period, for which data is actually transmitted, and the guard interval. The receiver gathers data for the effective symbol period after removing the guard interval, and then performs demodulation thereon.

In order to prevent orthogonality destruction which may occur due to a delay of sub-carriers, a signal of the last interval is copied in an effective symbol interval, and then inserted in the guard interval, and this is called a Cyclic Prefix (CP). The insertion of the CP reduces bandwidth efficiency and brings a loss of a Signal-to-Noise Ratio (SNR) for the effective symbol interval. Therefore, it is necessary to set a length of the effective symbol interval such that the SNR loss due to the CP insertion is minimized. In addition, it is possible to cancel the ISI by inserting a CP longer than a delay spread into a guard interval between adjacent guard intervals.

That is, as described above, the OFDM communication system inserts the CP between all symbols in the time domain before transmission in order to cope with multipath channels. In order to completely cancel the ISI occurring in the multipath channels, the CP should be longer in length than the channel impulse response.

In the OFDM communication system, an effect of symbol timing is considerable in high-order modulation of sub-carriers. Therefore, the OFDM communication system estimates a symbol timing offset using the channel impulse response and minimizes the ISI through the estimation.

Figure 2A:
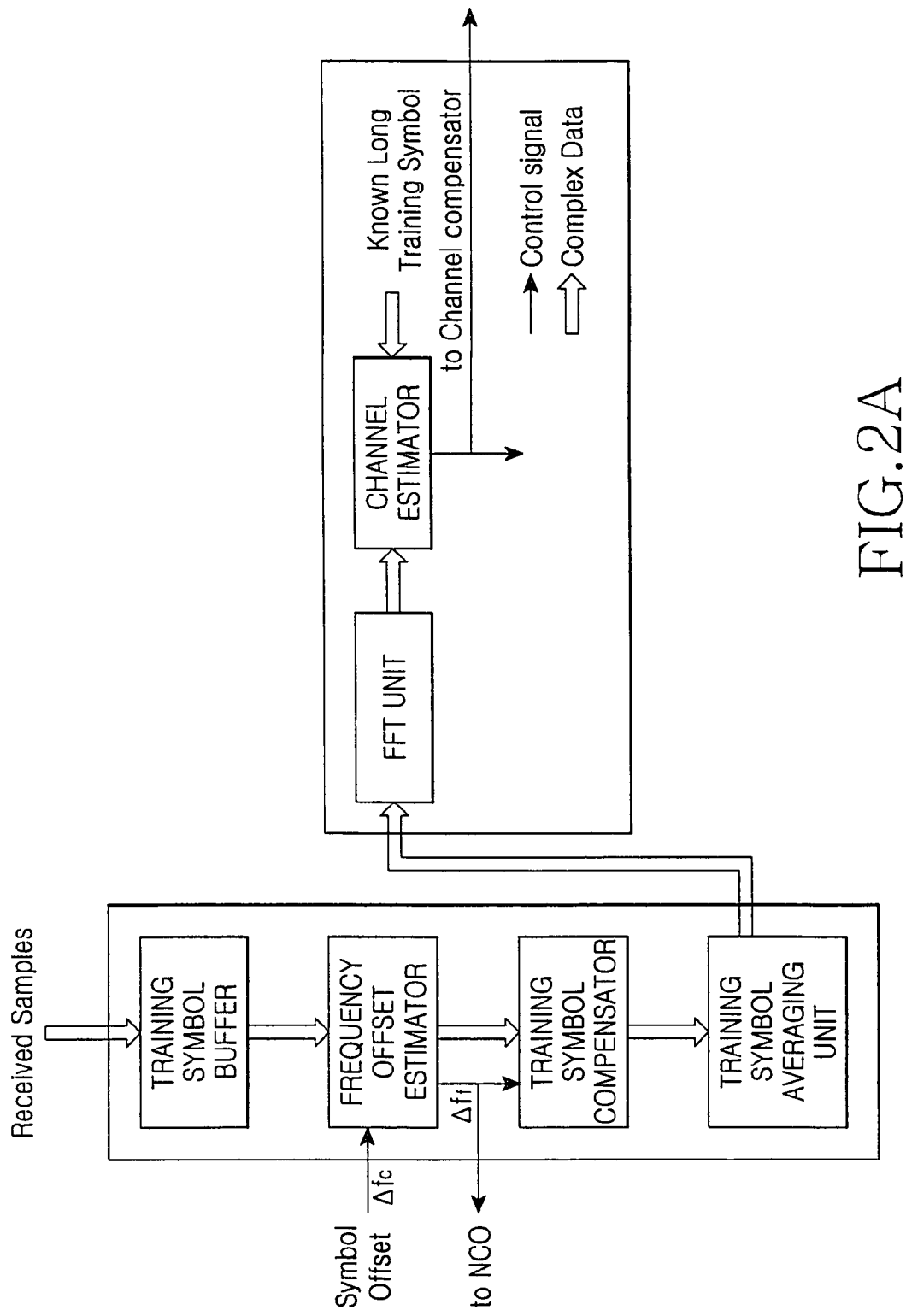
FIGS. 2A and 2B are diagrams illustrating symbol timing offset estimation operations according to the conventional technology.
Figure 2B:
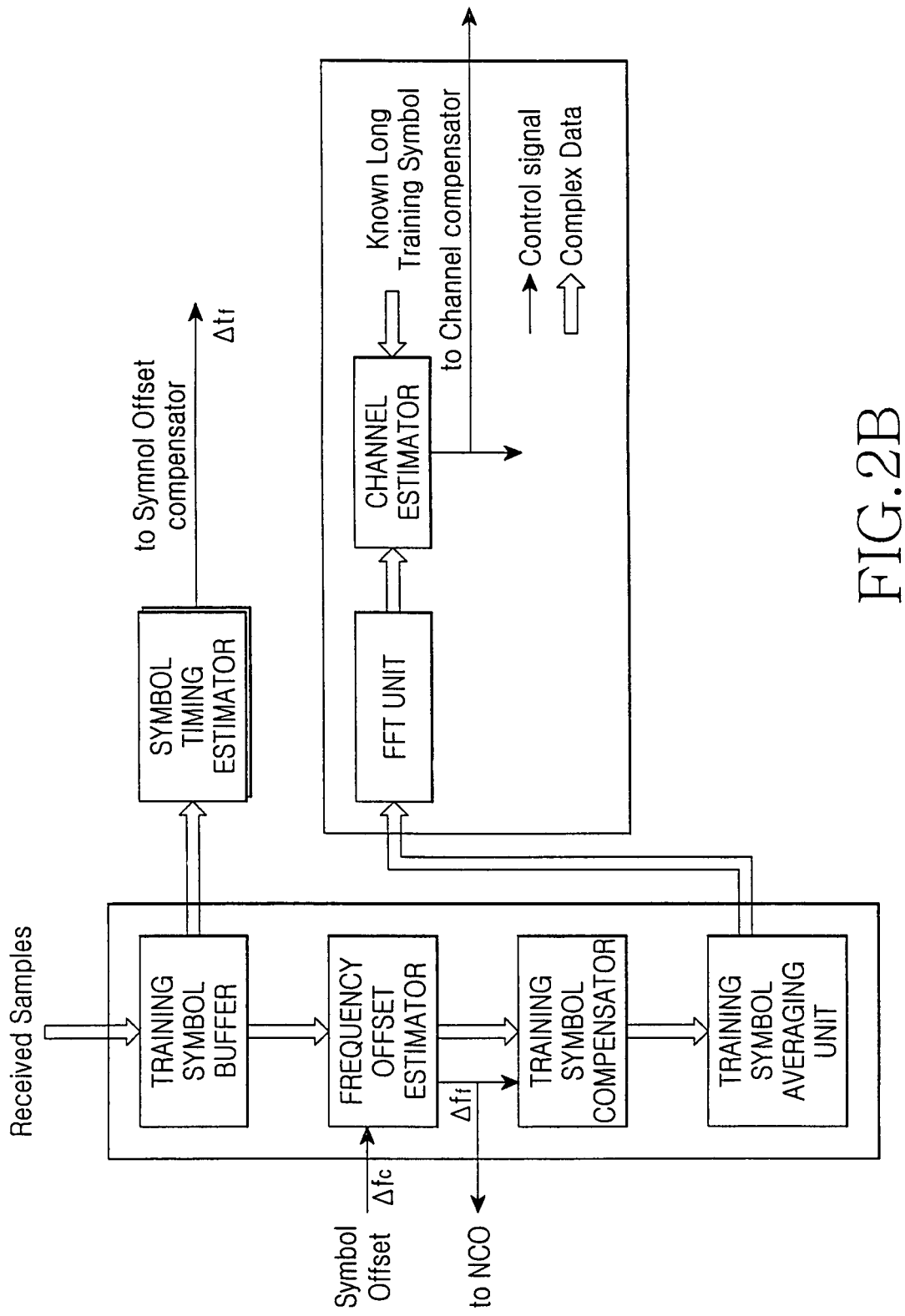

FIGS. 2A and 2B illustrate symbol timing offset estimation operations according to the conventional technology.

Referring to FIG. 2A, there is shown a general method for estimating a symbol timing offset in the OFDM communication system. It is noted that the method intactly uses the symbol timing offset estimated from training symbols. However, this structure does not consider the channel delay at all. Therefore, this method generally shifts a symbol timing offset forward by about 4 samples before processing, taking an effect of the channel delay into account.

Referring to FIG. 2B, there is shown a cross-correlation method for estimating a symbol timing offset in the OFDM communication system. It is noted that the cross-correlation method estimates a fine symbol timing offset. However, like the method of FIG. 2A, the cross-correlation method of FIG. 2B also does not consider the channel delay at all. For reduction of the channel delay, the cross-correlation method shifts a symbol timing offset forward by a predetermined size to reduce an effect of the channel delay. In this case, however, the method is less susceptible to an effect of noises, but decreases in reliability of peak detection.

Figure 3:
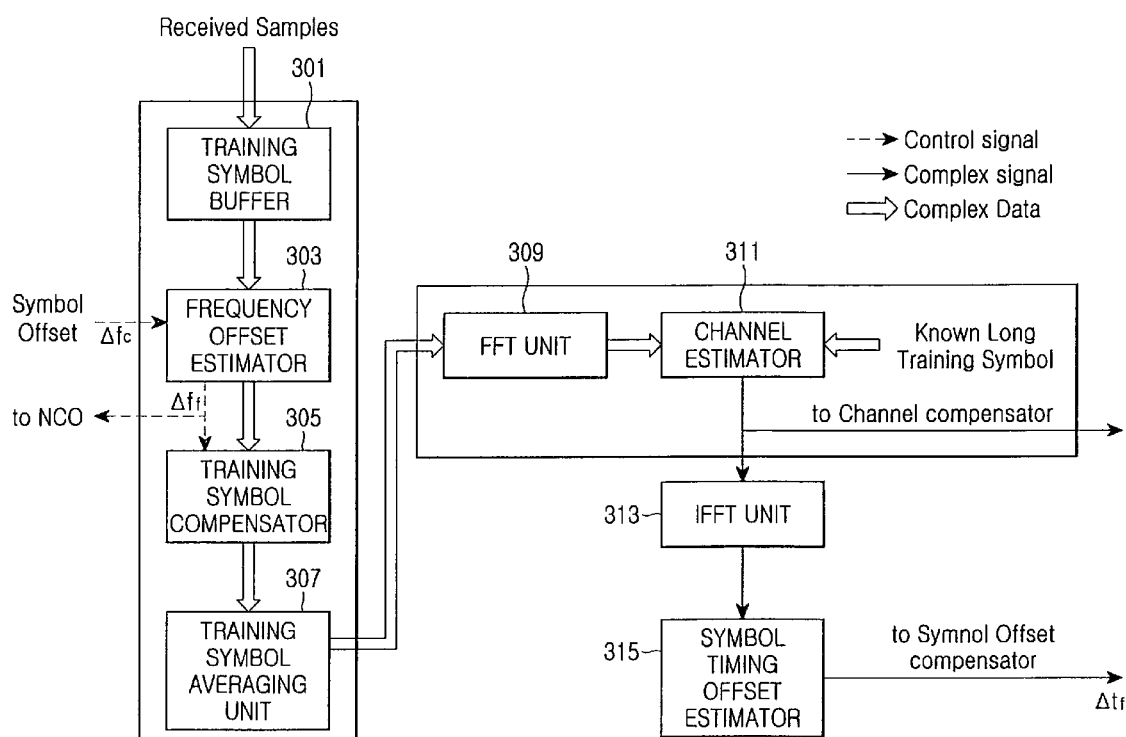
FIG. 3 is a diagram illustrating a symbol timing offset estimation operation in a receiver according to an embodiment of the present invention.

FIG. 3 illustrates a symbol timing offset estimation operation in a receiver according to an embodiment of the present invention.

Referring to FIG. 3, in the receiver, a training symbol buffer 301 buffers received specific samples, for example, a channel impulse response, and delivers the channel impulse response to a frequency offset estimator 303. The frequency offset estimator 303 estimates a frequency offset using the channel impulse response, and delivers the estimated frequency offset to a training symbol compensator 305.

The training symbol compensator 305 compensates the training symbol using the frequency offset estimated by the frequency offset estimator 303, and delivers the compensated training symbol to a training symbol averaging unit 307. The training symbol averaging unit 307 calculates an average of the training symbols compensated by the training symbol compensator 305, and delivers the calculated average to an FFT unit 309.

The FFT unit 309 performs FFT processing on the training symbols averaged by the training symbol averaging unit 307, and delivers the FFT-processed symbols to a channel estimator 311. The channel estimator 311 performs channel estimation using the symbols output from the FFT unit 309 and previously known training symbols, and delivers the channel estimation result to an Inverse Fast Fourier Transform (IFFT) unit 313. The IFFT unit 313 performs IFFT processing on the frequency-domain signal output from the channel estimator 311, generating a time-domain signal, and delivers the time-domain signal to a symbol timing offset estimator 315.

For estimation of a fine symbol timing offset, the symbol timing offset estimator 315, receiving the output signal of the IFFT unit 313, varies a search range and detects the peak power. Thereafter, the symbol timing offset estimator 315 estimates the best symbol timing offset by calculating channel delay duration using a variable threshold. That is, the symbol timing offset estimator 315 estimates the channel delay duration, and estimates a symbol timing offset if the channel delay duration is less than or equal to the guard interval. For estimation of the channel delay duration, the symbol timing offset estimator 315 estimates a search starting point and ending point, and estimates the channel delay duration using a difference between the starting point and the ending point. In addition, it is preferable that the search range is set as an FFT duration length, and the threshold is set so as to estimate up to a path having a specific percentage of the peak power.

Figure 4:
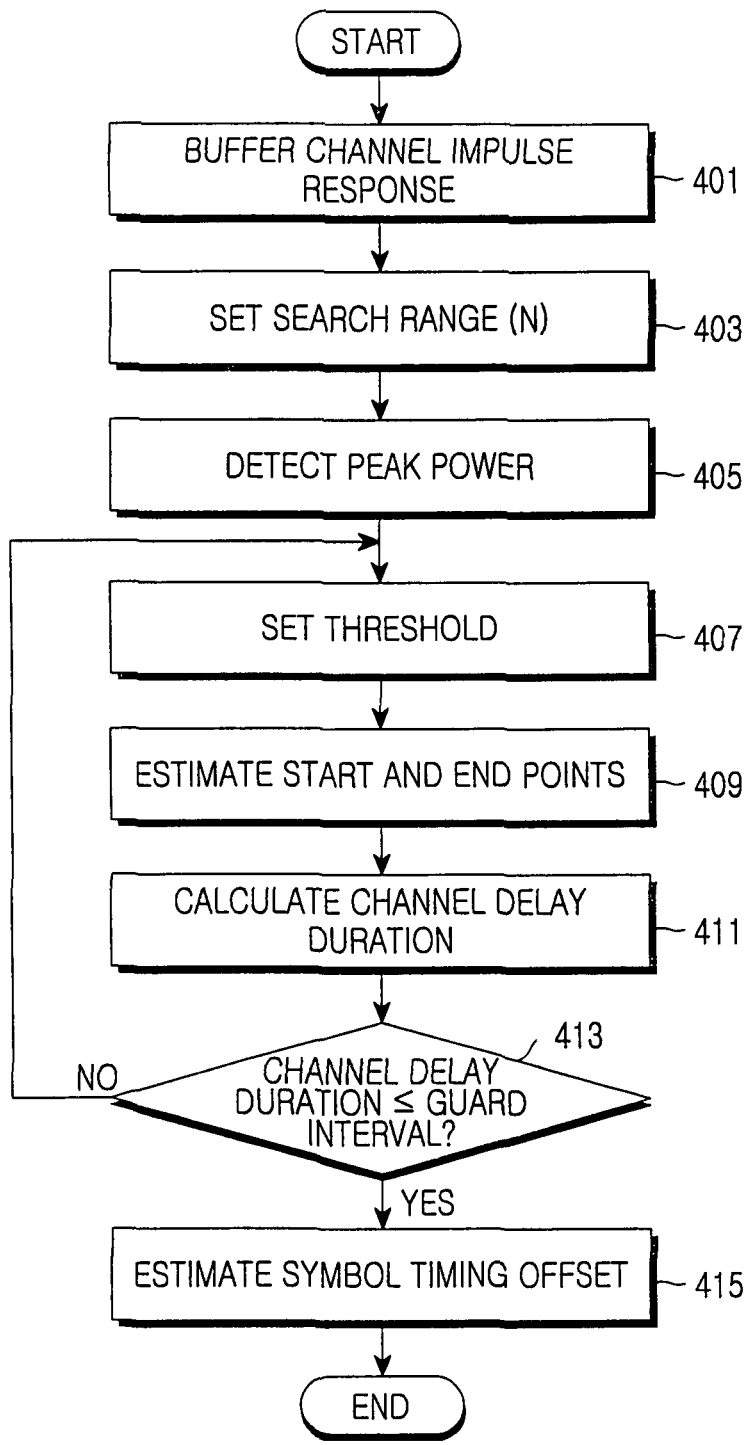
FIG. 4 is a diagram illustrating a symbol timing offset estimation operation according to an embodiment of the present invention.

FIG. 4 illustrates a symbol timing offset estimation operation according to an embodiment of the present invention.

Referring to FIG. 4, in step 401, a receiver according to an embodiment of the present invention receives a signal transmitted by a transmitter, via a reception antenna, and buffers a channel impulse response in the signal received via the reception antenna.

In step 403, the receiver, after buffering the channel impulse response, sets a search range for symbol timing offset estimation, and then proceeds to step 405. Herein, preferably, the receiver can vary a value of the search range taking complexity into account, and basically sets an FFT duration length to N. In addition, preferably, the search range is set such that it starts at a middle point of the FFT duration.

In step 405, the receiver detects peak power in the set search range, and then proceeds to step 407 where it sets a threshold. Herein, the peak power is replaceable with absolute peak power. In addition, the threshold should be set lower than the peak power, and preferably, the threshold is set to estimate up to a path having 75% of the peak power. That is, the threshold is set to a power value corresponding to 75% of the peak power.

After setting the threshold, the receiver estimates a starting point and an ending point in step 409, and then calculates channel delay duration in step 411. In other words, the receiver estimates the starting point and the ending point, and calculates channel delay duration using a difference between the estimated ending point and starting point. In addition, in calculating the channel delay duration, the receiver uses the set variable threshold.

After calculating the channel delay duration in step 411, the receiver proceeds to step 413 where it compares the calculated channel delay duration with the guard interval. In an embodiment of the present invention, if the channel delay duration is greater than the guard interval, the receiver re-estimates a profile of the channel. This is to prevent the channel delay duration from being greater than the guard interval, thereby maximally reducing the ISI. That is, with use of a size of the channel delay duration, the receiver optimizes the channel delay profile to be estimated, thereby minimizing the ISI. To this end, the receiver proceeds to step 407 if the channel delay duration is greater than the guard interval.

However, if the channel delay duration is less than or equal to the guard interval, the receiver proceeds to step 415 where it estimates a fine symbol timing offset. Herein, the fine symbol timing offset can be estimated using Equation (2).

$$\text{Fine Symbol Timing Offset} = \text{Starting Point} - (\text{FFT duration}/2) \quad (2)$$

As described above, an embodiment of the present invention estimates an accurate symbol timing offset using a channel impulse response, thereby minimizing the ISI.

As can be understood from the foregoing description, in the wireless communication system according to the present invention, the symbol timing offset estimation apparatus and method can minimize an effect of the wireless channels. In particular, the present invention estimates an accurate symbol timing offset using a channel impulse response in the OFDM communication system, thereby minimizing the ISI which may occur in the conventional technology.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method of estimating a symbol timing offset in an orthogonal frequency division multiplexing communication system, the method comprising:

detecting a channel impulse response within a fast Fourier transform (FFT) duration; and calculating a channel delay duration based on the detected channel impulse response, the calculating comprising
   setting a search range within the FFT duration,
   detecting peak power within the search range,
   setting a threshold based on the detected peak power,
   estimating a starting point and an ending point of the detected channel impulse response within the search range based on the detected peak power and the threshold, and
   calculating the channel delay duration based on the estimated starting point and ending point;

determining whether the calculated channel delay duration is less than or equal to a guard interval within the FFT duration;

estimating the symbol timing offset by subtracting a value corresponding to a half of the FFT duration from the estimated starting point in response to the calculated channel delay duration being less than or equal to the guard interval; and resetting the threshold and recalculating the channel delay duration based on the reset threshold in response to the calculated channel delay duration being greater than the guard interval.

2. The method of claim 1, wherein the search range is set to start from a middle point of the FFT duration, and have the same length as that of the FFT duration.

3. The method of claim 1, wherein the threshold is set lower than the detected peak power.

4. The method of claim 3, wherein the threshold is set to 75% of the detected peak power.

5. An apparatus configured to estimate a symbol timing offset in an orthogonal frequency division multiplexing (OFDM) communication system, the apparatus comprising:

an inverse fast Fourier transform unit configured to convert a frequency-domain OFDM symbol, in which channel estimation is performed, into a time-domain OFDM symbol; and a symbol timing offset estimator configured to
   receive the time-domain OFDM symbol,
   detect a channel impulse response within a fast Fourier transform (FFT) duration, and
   calculate a channel delay duration based on the detected channel impulse response, wherein the symbol timing offset estimator is further configured to
   set a search range within the FFT duration,
   detect peak power within the search range,
   set a threshold based on the detected peak power,
   estimate a starting point and an ending point of the detected channel impulse response within the search range based on the detected peak power and the threshold,
   calculate the channel delay duration based on the estimated starting point and ending point,
   determine whether the calculated channel delay duration is less than or equal to a guard interval within the FFT duration,
   estimate the symbol timing offset by subtracting a value corresponding to a half of the FFT duration from the estimated starting point in response to the calculated channel delay duration being less than or equal to the guard interval, and
   reset the threshold and recalculate the channel delay duration based on the reset threshold in response to the calculated channel delay duration being greater than the guard interval.

6. The apparatus of claim 5, wherein the search range is set to start from a middle point of the FFT duration, and have the same length as that of the FFT duration.

7. The apparatus of claim 5, wherein the threshold is set lower than the detected peak power.

8. The apparatus of claim 7, wherein the threshold is set to 75% of the detected peak power.

* * * * *